(12) United States Patent
Mount, III et al.

(10) Patent No.: US 10,434,540 B2
(45) Date of Patent: Oct. 8, 2019

(54) NONCONDUCTIVE FILMS FOR LIGHTER THAN AIR BALLOONS

(71) Applicant: SAN DIEGO GAS & ELECTRIC COMPANY, San Diego, CA (US)

(72) Inventors: Eldridge M. Mount, III, San Diego, CA (US); Denis S. Sanford, San Diego, CA (US)

(73) Assignee: San Diego Gas & Electric Company c/o Sempra Energy, San Diego, CA (US)

( * ) Notice: Subject to any disclaimer, the term of this patent is extended or adjusted under 35 U.S.C. 154(b) by 0 days.

(21) Appl. No.: 15/094,916

(22) Filed: Apr. 8, 2016

(65) Prior Publication Data

US 2016/0221037 A1 Aug. 4, 2016

Related U.S. Application Data

(62) Division of application No. 14/067,878, filed on Oct. 30, 2013.

(51) Int. Cl.
*B05D 5/06* (2006.01)
*B05D 3/10* (2006.01)
(Continued)

(52) U.S. Cl.
CPC ............ *B05D 5/00* (2013.01); *A63H 27/10* (2013.01); *B05D 1/286* (2013.01); *B05D 3/007* (2013.01);
(Continued)

(58) Field of Classification Search
CPC . B05D 5/061; B05D 3/101; A63H 2027/1025
(Continued)

(56) References Cited

U.S. PATENT DOCUMENTS 2,139,640 A 12/1938 Dorn
2,917,385 A * 12/1959 Byrne .................... G03G 15/22
101/DIG. 37
(Continued)

FOREIGN PATENT DOCUMENTS

EP 0792741 A1 9/1997
JP 0243036 A 2/1990
(Continued)

OTHER PUBLICATIONS

Julian, "Transforming an Industry—Capturing the Promise of 100% Bio-based Polymers", Draths Corporation Presentation at BioPlastek, Jun. 2011, pp. 1-27.
(Continued)

*Primary Examiner* — Cachet I Proctor
(74) *Attorney, Agent, or Firm* — Sheppard Mullin Richter & Hampton LLP

(57) ABSTRACT

Non-conductive films for constructing lighter than air balloons are provided. A non-conductive film may comprise multiple layers of gas barrier polymers. An outer surface printable layer and an interior heat or ultrasonically sealable layer may also be included. Each gas barrier film may comprise multiple (e.g., from 3 to approximately 75) barrier layers. A gas barrier core has a nano-layer structure. A gas barrier core may also comprise a biodegradable film or a bio-based film. A non-conductive film may comprise a metal layer for enhancing gas barrier properties. The metal layer may be discontinuous. The metal layer may be conductive and coated with an insulating top coat.

2 Claims, 11 Drawing Sheets

(51) Int. Cl.
*A63H 27/10* (2006.01)
*B05D 5/00* (2006.01)
*B32B 15/20* (2006.01)
*B32B 7/12* (2006.01)
*B32B 15/08* (2006.01)
*B32B 27/08* (2006.01)
*B32B 27/30* (2006.01)
*B32B 27/32* (2006.01)
*B05D 1/28* (2006.01)
*B05D 3/00* (2006.01)
*C23C 26/00* (2006.01)

(52) U.S. Cl.
CPC ............... *B32B 7/12* (2013.01); *B32B 15/08* (2013.01); *B32B 15/20* (2013.01); *B32B 27/08* (2013.01); *B32B 27/308* (2013.01); *B32B 27/32* (2013.01); *C23C 26/00* (2013.01); *A63H 2027/1025* (2013.01); *B32B 2255/06* (2013.01); *B32B 2255/26* (2013.01); *B32B 2307/31* (2013.01); *B32B 2307/4026* (2013.01); *B32B 2307/7163* (2013.01); *B32B 2307/7242* (2013.01); *Y10T 428/24917* (2015.01); *Y10T 428/265* (2015.01); *Y10T 428/31678* (2015.04)

(58) Field of Classification Search
USPC .......................................... 427/256, 259, 261
See application file for complete search history.

(56) References Cited

U.S. PATENT DOCUMENTS

| | | | | |
|---|---|---|---|---|
| 4,077,588 | A * | 3/1978 | Hurst | B64B 1/40 244/126 |
| 4,407,871 | A * | 10/1983 | Eisfeller | B05D 5/068 427/250 |
| 4,749,591 | A * | 6/1988 | Ronchi | H01G 13/06 118/315 |
| 4,832,983 | A * | 5/1989 | Nagatomi | C23C 14/042 427/177 |
| 4,928,908 | A * | 5/1990 | Horii | B64B 1/40 244/31 |
| 5,933,947 | A * | 8/1999 | Minamizawa | H01G 4/012 29/25.41 |
| 6,068,933 | A * | 5/2000 | Shepard | B29C 47/0021 428/474.4 |
| 6,106,627 | A * | 8/2000 | Yializis | B05D 1/60 118/202 |
| 6,420,041 | B1 * | 7/2002 | Amon | B32B 15/08 428/461 |
| 6,455,138 | B1 | 9/2002 | Murano | |
| 6,858,287 | B2 * | 2/2005 | Fields | B32B 3/10 428/156 |
| 7,121,915 | B2 * | 10/2006 | Banks | A63H 27/10 446/220 |
| 7,972,193 | B2 * | 7/2011 | Sarnstrom | A63H 27/10 446/220 |
| 8,323,759 | B2 | 12/2012 | Chicarella et al. | |
| 9,289,966 | B2 | 3/2016 | Fischer et al. | |
| 2003/0099851 | A1 | 5/2003 | Mount, III et al. | |
| 2004/0033755 | A1 | 2/2004 | Banks | |
| 2004/0226649 | A1 | 11/2004 | Van Dyke | |
| 2007/0134426 | A1 | 6/2007 | Hayashi | |
| 2007/0254160 | A1 * | 11/2007 | Kravitz | C09D 7/1216 428/423.1 |
| 2008/0019003 | A1 * | 1/2008 | Phillips | G02B 5/284 359/582 |
| 2009/0022919 | A1 * | 1/2009 | Chicarella | A63H 27/10 428/35.9 |
| 2010/0159795 | A1 | 6/2010 | Sarnstrom et al. | |
| 2010/0221560 | A1 * | 9/2010 | Knoerzer | B32B 27/08 428/458 |
| 2010/0245991 | A1 | 9/2010 | Ishihara et al. | |
| 2010/0287801 | A1 * | 11/2010 | Borchardt | A63H 27/10 40/212 |
| 2011/0039098 | A1 * | 2/2011 | Forloni | B32B 27/34 428/339 |
| 2011/0076911 | A1 | 3/2011 | Bona et al. | |
| 2014/0004286 | A1 | 1/2014 | Sakellarides et al. | |
| 2015/0298437 | A1 | 10/2015 | Jenkins | |

FOREIGN PATENT DOCUMENTS

| | | | |
|---|---|---|---|
| JP | 04034590 A | 2/1992 | |
| JP | 09234823 A | 9/1997 | |
| JP | 2011093962 A | 5/2011 | |
| SG | 139581 A1 | 2/2008 | |
| WO | WO 03099586 A1 * | 12/2003 | B44C 1/14 |
| WO | 2013072918 A2 | 5/2013 | |
| WO | 2013083261 A1 | 6/2013 | |

OTHER PUBLICATIONS

Bozell, "Technology development for the production of biobased products from biorefinery carbohydrates—the US Department of Energy's 'Top 10' revisited", Green Chemistry, Apr. 2010, pp. 539-554, vol. 12, No. 4.

* cited by examiner

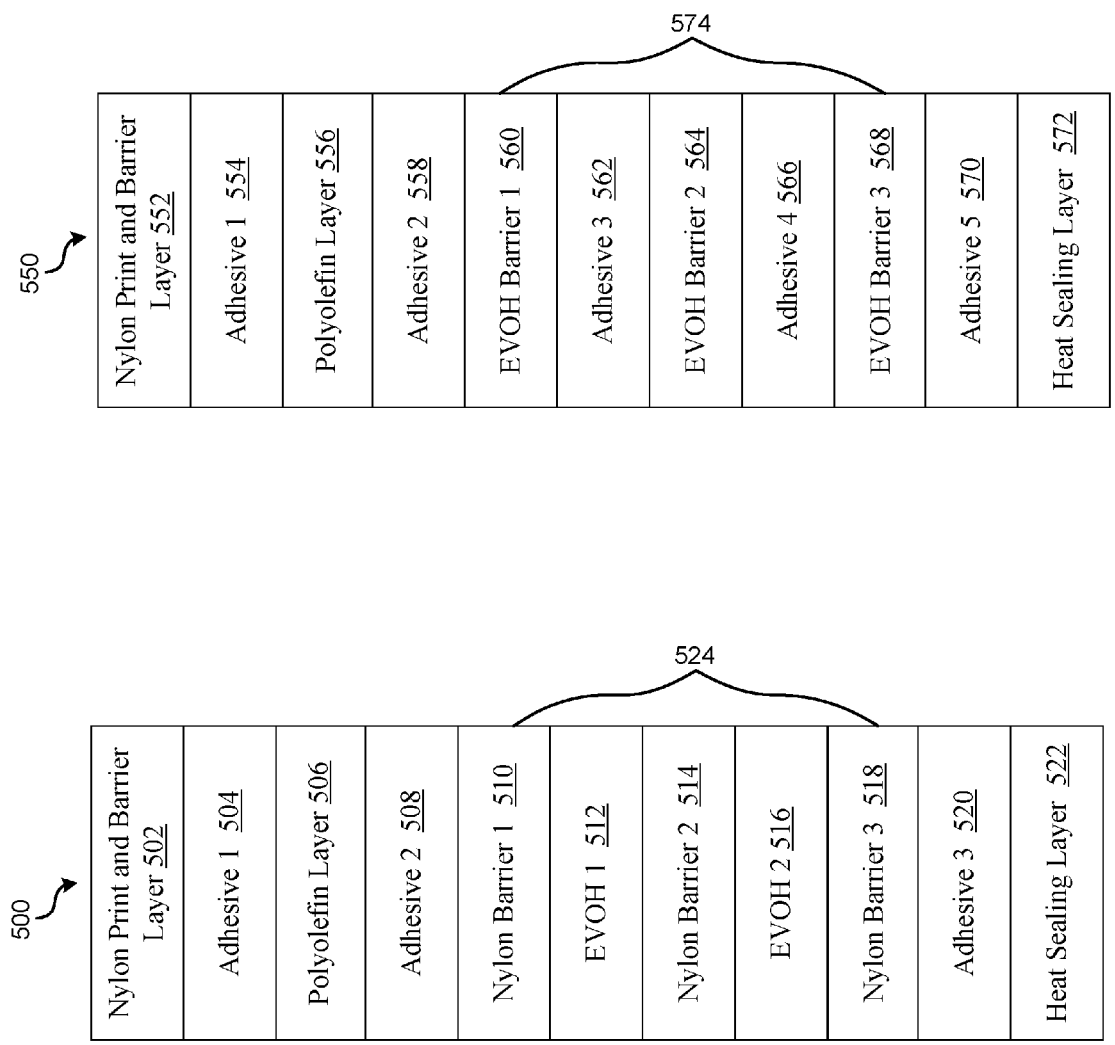

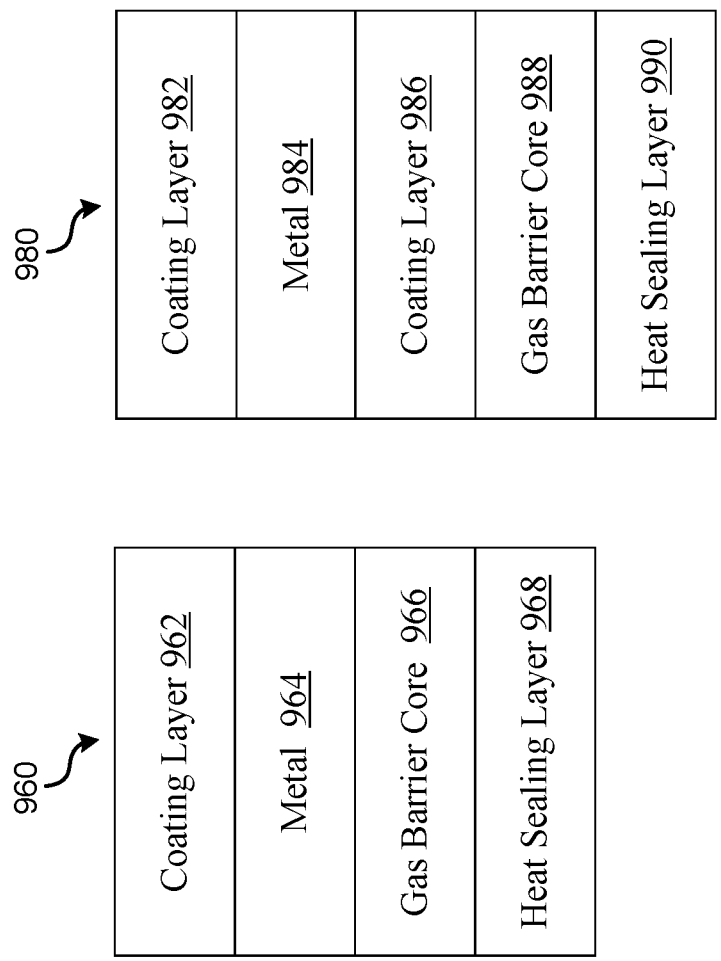

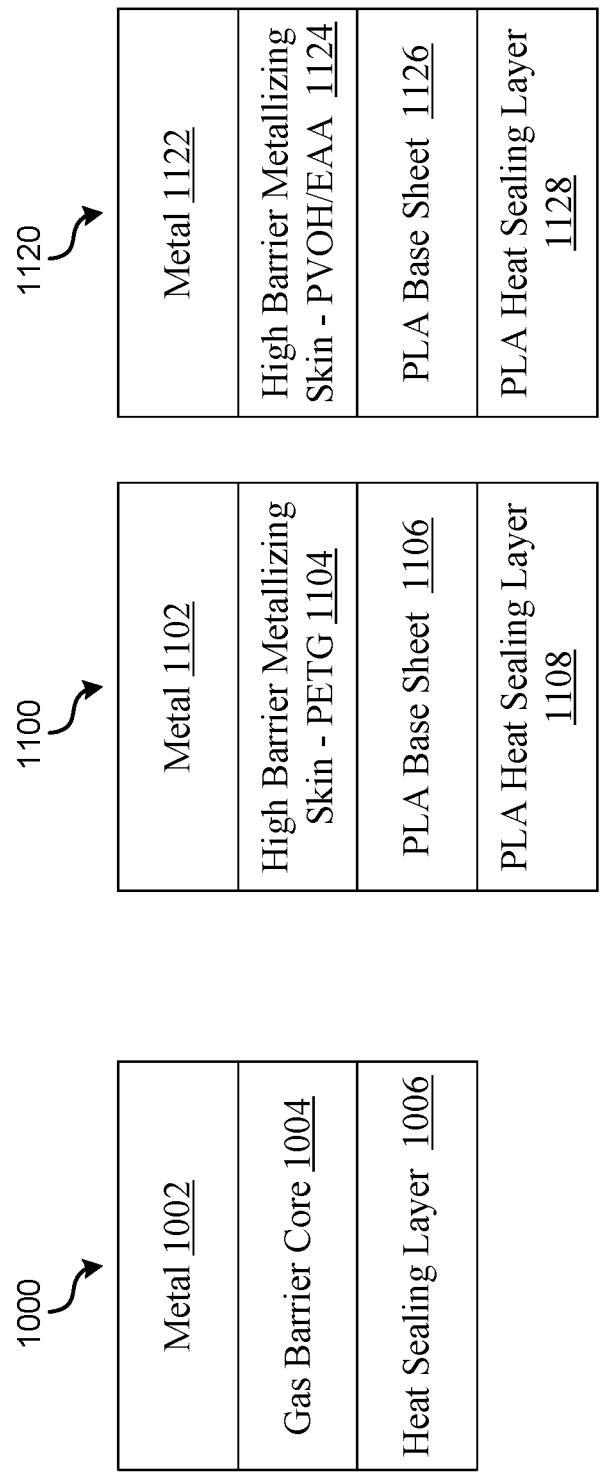

NONCONDUCTIVE FILMS FOR LIGHTER THAN AIR BALLOONS

CROSS-REFERENCE TO RELATED APPLICATIONS

This application is a divisional application of U.S. patent application Ser. No. 14/067,878, filed Oct. 30, 2013, titled "Nonconductive Films for Lighter Than Air Balloons," the content of which is incorporated herein by reference in its entirety.

TECHNICAL FIELD

The present invention relates generally to lighter than air balloons, and more particularly, some embodiments relate to non-conductive films for lighter than air balloons.

DESCRIPTION OF THE RELATED ART

Lighter than air balloons are popular and have many usages around the world such as toys, advertising media, articles in displays, etc. Lighter than air balloons are filled with lighter than air gases and remain aloft due to its buoyancy. Lighter than air balloons are made of materials that have gas barrier properties. Materials having gas barrier properties may prevent ingress and egress of gas thereby maintaining the lighter than air balloons afloat. Most of lighter than air balloons are made of materials that are electrically conductive. Lighter than air balloons may be released under supervision for various purposes. However, accidental releases may be inevitable. Released balloons may become entangled at different structures such as buildings, trees, or power transmission lines. The conductivity of the materials may cause power outages and service disruption to users, causing a negative impact to the users and economical losses.

BRIEF SUMMARY OF THE INVENTION

According to various embodiments of the invention, non-conductive films are provided. The non-conductive films may be used to construct lighter than air balloon envelopes. Various embodiments comprise multiple layers of gas barrier polymers. An outer surface printable layer and an interior heat or ultrasonically sealable layer may also be included. Each gas barrier film may comprise multiple (e.g., from 3 to approximately 75) barrier layers. In one embodiment, a gas barrier comprises from 5 to 27 barrier layers. In one embodiment, the gas barrier core has a nano-layer structure. Various embodiments comprise a bio-degradable film or a bio-based film. Further embodiments may comprise a metal layer for enhancing gas barrier properties. The metal layer may be conductive and coated with an insulating top coat. Other embodiments may comprise a metallization layer having patterned or discontinuous metal patches.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIGS. 5A-5B illustrated exemplary 11-layer non-conductive balloon films in accordance with various embodiments of the present application.

FIGS. 9A-9E illustrated exemplary non-conductive balloon films in accordance with various embodiments of the present application.

FIG. 10 illustrates an exemplary non-conductive film in accordance with an embodiment of the present application.

FIGS. 11A-B illustrate exemplary non-conductive balloon films in accordance with various embodiments of the present application.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

Most existing balloons are made of oriented polyester (PET) or oriented Nylon (OPA) films. The films may be single-layer or multiple-layer. Conventionally, lighter-than-air balloons are usually constructed of electrically conductive materials such as metallized Biaxially-oriented polyethylene terephthalate ("BoPET" or "Mylar".) The films are metallized to enhance the gas barrier properties and are often coated with a heat sealant to permit forming of the balloon. The balloon envelope is made by sealing, such as heat sealing peripheral portions of panels made of the above material while in a two dimension lay-flat form to any desired two-dimensional shape. The material can be a non-elastomeric polymer sheet carrying a continuous metal layer on at least one surface. PET and Nylon films are known to be very susceptible to pinhole formation in flexing (e.g., folding, creasing, or forming into pouches), which may cause a significant loss of gas barrier properties and greatly reduce a balloon's flight time.

Figure 1:
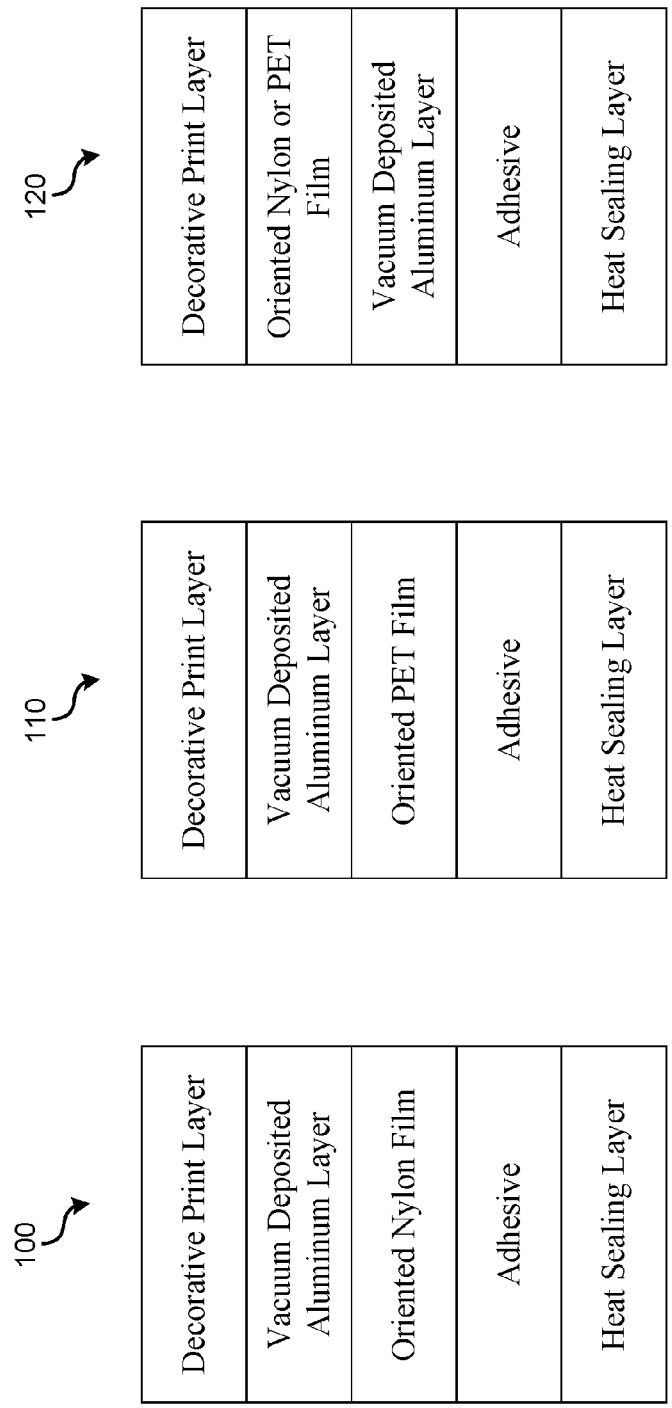
FIGS. 1A-1C illustrate constructions of prior art conductive balloon envelopes.

FIGS. 1A-1C illustrate constructions of prior art conductive balloon envelopes 110, 120, and 130. A metal layer (e.g., a thin metal foil such as an aluminum layer) may be laminated to or vacuum deposited directly on a film surface (e.g., an oriented Nylon film or a PET film.) The thin metal layer is impermeable to the lighter than air gas, whereas the layer of the nonelastomeric polymer provides structural integrity for the metal as well as limiting diffusion from pinholes or imperfections that may exist in the continuous metal layer. These materials have a conductive surface.

Non-surface conductive laminations remain conductive as long as the structure comprises a continuous layer of metal. For example, two continuous nonelastomeric films having a continuous layer of vapor deposited metal sandwiched therebetween may be used. This composite may be so produced by vapor depositing the metal layer on either layer of the nonelastomeric polymer film and subsequently laminating the remaining layer of nonelastomeric film to the vapor deposited metal layer. These laminated structures may have a low surface conductivity due to the nonconductive outer polymeric layers. However, as long as the metal layer is continuous, the lamination functions as a capacitor storing charges. The balloon can become electrically conductive under high electrical field strengths due to an electrical breakdown of the nonelastic films included in the balloon film.

Figure 2:
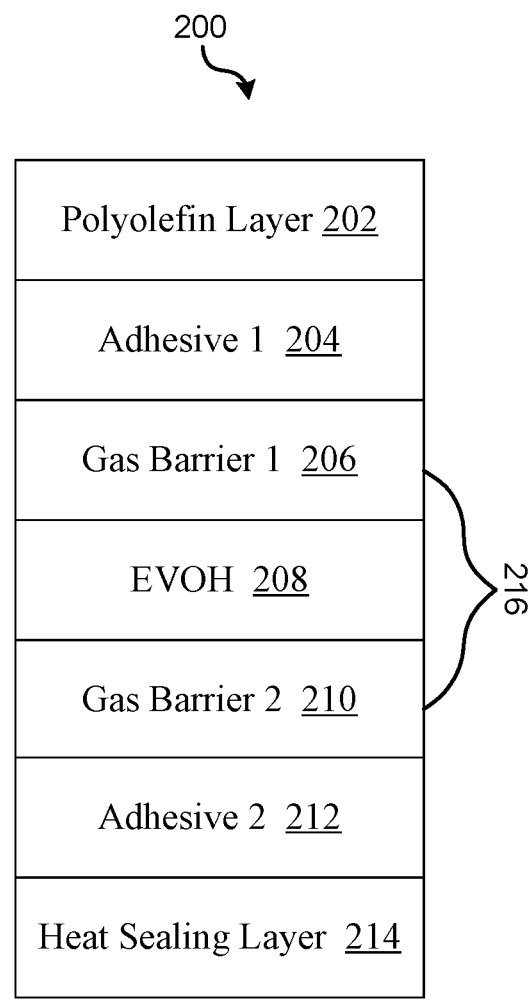
FIG. 2 illustrates an exemplary non-conductive balloon film in accordance with an embodiment of the present application.

FIG. 2 illustrates an exemplary non-conductive film 200 in accordance with an embodiment of the present application. The non-conductive film 200 may be used to make a lighter than air balloon envelope. The illustrated non-conductive balloon film 200 is a 7-layer coextruded film. In one embodiment, each film may be 12 to 78 microns thick (0.5 to 3 mils.) The exemplary non-conductive balloon film 200 comprises multiple layers: a polyolefin layer 202, a first adhesive layer 204, a first gas barrier layer 206, an Ethylene vinyl alcohol ("EVOH") gas barrier layer 208, a second gas barrier layer 210, a second adhesive layer 212, and a heat sealing layer 214. The film 200 comprises a gas barrier core 216. The gas barrier core 216 may comprise a set of polymeric gas barrier layers. In the illustrated example, the first gas barrier layer 206, the EVOH layer 208, and the second gas barrier layer 210 create the gas barrier core 216. Each polymeric gas barrier layer has a first surface and a second surface.

Each layer of the gas barrier core 216 may be selected to control the gas barrier properties of the film 200. For example, the first gas barrier layer 206 and the second gas barrier layer 210 may be nylon (e.g., Nylon 66, Nylon 6, Nylon MDX6, Nylon 6,10 or an amorphous nylon.) The material for the first gas barrier 206 or the second gas barrier 210 may be selected according to the gas barrier core 216, compatibility with the EVOH used in the EVOH layer 208, and flex crack resistance. The EVOH may be selected from various grades of copolymer with varying ethylene contents based on the gas barrier levels of the EVOH for the film 200. For the gas barrier core 216 of the illustrated example, the EVOH layer 208 is sandwiched between the first gas barrier 206 and the second gas barrier 210.

In other embodiments, a gas barrier core may have a structure such that a nylon barrier layer is sandwiched between a first EVOH layer and a second EVOH layer. The gas barrier core may be constructed with alternating EVOH layers and nylon layers. The total number of the EVOH and the nylon layers may vary thereby affecting the physical and barrier properties of a non-conductive film such as the film 200. The use of nylon layers in combination with the EVOH layers enhances the overall gas barrier properties of the film 200 due to the inherent gas barrier characteristics of the nylon material. In addition, this structure may further improve the EVOH durability. The nylon materials included may selectively absorb moisture from the film 200 acting as a desiccant for the EVOH and maintaining the superior gas barrier property of the EVOH.

The illustrated exemplary non-conductive film 200 comprises a first surface that is the polyolefin layer 202 and a second surface that is the heat sealing layer 214. The polyolefin layer 202 may be used for decoration purposes and the heat sealing layer 214 may form an enclosed balloon envelope. The polyolefin layer 202 may be a functionalized polymer or a mix of polymers. The polyolefin layer 202 may be functionalized by a variety of surface treatment methods (e.g., corona, flame, atmospheric plasma, or chemical treatment), which may enhance the surface receptivity to decorative methods such as inks, coatings, or metal layers. The first adhesive layer 204 affixes the gas barrier core 216 to the polyolefin layer 202. The second adhesive layer 212 affixes the gas barrier core 216 to the heat sealing layer 214.

In various embodiments, the first adhesive layer 204 may be different from the second adhesive layer 212 as the surfaces of the barrier core 216 may be made of different polymers. In various embodiments, the relative bond strengths required for affixing the gas barrier core 216 to the first surface (i.e., the polyolefin layer 202) and the second surface (i.e., the heat sealing layer 214) may be different due to the fact that the first surface and the second surface may be of different materials. Depending on the relative bond strengths desired of a non-conductive film 200, the first adhesive layer 204 and the second adhesive layer 212 may be the same or different. In various embodiments, the first adhesive layer 204 and the second adhesive layer 212 each may comprise multiple layers as a single bonding layer composition may be inadequate to affix the barrier core 216 to either the polyolefin layer 202 or the heat sealing layer 214.

Various embodiments may comprise a decoration layer. In some embodiments, the polyolefin layer may be the decoration layer. The polyolefin layer 202 may be selected according to the decoration method to be used. It may be selected as such to be resistant to abrasion, puncture, surface slip and/or antiblocking properties. The polyolefin layer 202 may carry an opaque pigment, a transparent color, or tint, and may be receptive to metal deposition or solution and emulsion coating. Decorations may be applied to the interior surface of the polyolefin layer 202 by lamination. In further embodiments where the polyolefin layer 202, the first adhesive layer 204, the gas barrier core 216, and the second adhesive layer are transparent, decorations may be applied to the heat sealing layer 214.

The surface polyolefins are selected to enhance heat sealing properties and graphic art properties to permit decorative images and messages to be applied to the balloon envelope. The decoration layer may be constructed of a resin material. Exemplary resin materials include polyolefin resins, copolymers of polyolefins (e.g., polyethylene, polypropylene, copolymers of polyethylene with minor amounts of other C4-10 olefins, particularly C4-8 polyolefins), or polymer resins (e.g. polyamides, polyesters, copolymers of ethylene and vinyl alcohol and the like.) Polyethylenes may include HPLDPE resins, or LLDPE resins having a density of from about 0.925 to about 0.945 g/cm$^3$. Polymers may include polypropylenes, preferably isotactic, having a density of from about 0.89 to about 0.91 g/cm$^3$. The polyolefin layer 202 may include any of several anti-cling, slip or anti-block additives (e.g., silicas, talcs, diatomaceous earth, silicates, or lubricants) to improve the slip characteristics of the layer. These additives are generally blended with the resin material in a predetermined amount (e.g., from about 100 to about 20,000 ppm.)

The heat sealable outer layer 214 allows the non-conductive balloon film to form a gas tight seal by heat or ultrasonic sealing of the balloon envelope. The heat sealable outerlayer 214 may be made of a resin such as polypropylene (PP), ethylene propylene copolymers, low density polyethylene (LDPE), linear low density polyethylene (LLDPE), medium density polyethylene (MDPE), high density polyethylene (HDPE), metallocene-catalyzed polyethylene (mPE), very low density polyethylene (VLDPE), or ultralow density polyethylene (ULDPE). The resin may also be blended to achieve a desired range of sealing, hot tack, physical or mechanical properties of the final film product. Homopolymers, terpolymers, or copolymers of ethylene and alpha-olefins such as metallocene catalyzed linear low density polyethylene (mLLDPE) may also be used. In various embodiments of copolymers, the weight percentage of the alpha-olefins resins may range between 4 and 15% (e.g., from 6 to 12% or from 6 to 10%) by weight. Alpha-olefin comonomers include propylene, 1-butene, 1-pentene, 1-hexene, 4-methyl-1-pentene, and 1-octene may also be used. The alpha-olefins range from about C3 to C20 (e.g., from C3 to C10, or from C3 to C8.)

Some embodiments may comprise a metal layer. The metal layer may be vapor deposited and used for graphic or gas barrier purposes. The metal layer may be applied by various deposition methods such as vapor deposition, sputtering, electron beam evaporation, printing or coating using a reflective metal bearing ink and deposition using wet deposition systems using silver and copper bearing solutions mixed with a reducing agent to produce a silver or copper deposition on a surface. The metal layer may be coated with a non-sealable and non-conductive polymeric overcoating.

In various embodiments, the polymeric overcoating may be added by an in-chamber coating process. The monomeric materials utilized may be relatively low in molecular weight, between 150 and 1000, and preferably in the range 200 to 300. In one embodiment, polyfunctional acrylates or mixtures of monofunctional acrylates and polyfunctional acrylates are used. In various embodiments, the monomers or monomer mixtures have an average of about two or more double bonds (i.e., a plurality of olefinic groups) and have vapor pressure in the range of $1 \times 10^{-6}$ Torr to $1 \times 10^{-1}$ Torr at standard temperature and pressure, (i.e., relatively low boiling materials). In one embodiment, the monomers or monomer mixtures have a vapor pressure of approximately $10^{-2}$ Torr at standard temperature and pressure. These high-vapor-pressure monomers can be flash vaporized at relatively low temperatures and thus are not degraded (cracked) by the heating process. The deposited monomer is reactive and cures to form an integral film when exposed to a radiation source. Accordingly, a substantially continuous coating is provided even though the deposited film may be very thin.

A vacuum chamber may be evacuated until the pressure is less than $1 \times 1^{-1}$ Torr and preferably $1 \times 10^{-5}$ Torr. In various embodiments, the vacuum chamber includes a substrate support such as a rotating drum. The support may be removable or interchangeable and has a surface of which the temperature is maintained sufficient to permit condensation onto the metallized substrate surface of a material that is being deposited thereon. The temperature may be in the range of 40° C. to 70° C., depending on the monomer or the monomer mixture used.

The curable monomer may be metered to a heated flash vaporizer system where the material is atomized, vaporized, and condensed on the surface of the movable metallized film, which travels at a speed between 1 and 1000 cm per second. In one embodiment, the vapor outlet of a flash vaporizer and the curing means may be mounted such that the metalized film is exposed to the flash vaporizer prior to being treated by the curing means. The curing is accomplished by opening the double bonds of the reactant molecules, such as by using an energy source (e.g., an apparatus that emits infra-red, electron beam, thermionic, or ultra violet radiation.) The condensed film is less than 4 microns thick.

In other embodiments, the metal layer may be coated with a non-conductive film layer such as via an out of line solution, emulsion, extrusion coating or related printing process, a spray coating process or by adhesive, thermal or extrusion lamination process.

In various embodiments, the metallized film is unwound (e.g., by tension) and guided into a coating machine. The coating machine may clean or pretreat the metal surface to aid adhesion of subsequently applied coatings. The metallized film may subsequently pass a coating station where the coating solution or ink is applied. The coating solution or ink may be applied by the coating and printing methods such as direct or indirect gravure, air knife coating, Myer rod coating, spray coating or the like. The surface of the coated metallized film may further be dried by a method suitable for the applied coating or ink.

The metallized film may be placed on an unwind station close to the coating station such that the metal surface is not contacted by the roller surfaces prior to the nip point. A separate extruder may be used to prepare a continuous supply of the molten polymer (e.g., LDPE) to be used as a coating layer. The metallized film is unwound, passed into the extrusion coater, passed over a nip roller, and pressed against a temperature-controlled roller adjacent to the nip. With the nip closed, the molten LDPE coating is extruded from a die as a thin molten membrane. The thin molten membrane may be dropped between the metallized film and the temperature controlled roll surface, which are adhered together at the nip point. The coated film may be cooled by a temperature controlled roller to a uniform temperature. The coated film may be subsequently wound into rolls to create balloons. In various embodiments, the coated LDPE layer may be opaque, clear, or pigmented.

In another embodiment, a laminating film, that is, a film to be laminated onto the metallized surface may be placed on a separate unwind station. The laminating film and the metallized film may be simultaneously unwound and passed into the laminator. Applying an adhesive, the two films may be adhered together by the lamination adhesive at a nip. The lamination adhesive may be a one or two part adhesive. In one embodiment, a one-part adhesive is diluted with solvent and applied to the lamination films. In another embodiment, a two part adhesive is mixed and applied to the lamination film. The lamination process continues with the film being passed through a curing oven and heated to initiate the adhesives curing reaction and cooled. The lamination adhesive may be a multiple layer coextrusion designed to enhance lamination adhesion and/or barrier properties.

In a further embodiment, a thermal laminating film, that is, the film to be thermally laminated to the metallized surface is placed on a separate unwind station. The thermal laminating film is passed over a temperature-controlled roller adjacent to the laminating nip to activate the thermal adhesive layer. The metallized film is passed over the laminating nip. With the laminating nip closed, the thermally activated adhesive is pressed against the metal surface of the metallized film to form a bond. The lamination continues with the film being passed around the temperature controlled roller and subsequently to a second temperatures controlled roll cool the thermally laminated film to a uniform temperature.

In further embodiments, a reflective film may be applied to or deposited on an outer surface of the non-conductive film such as the decoration layer 202. The reflective film may be discontinuous or patterned metal. The patterned vapor deposition may enhance the gas barrier properties of the film, and may also enhance the graphic appeal by adding a highly reflective surface while eliminating conduction across the balloon surface. The metal layer may be produced by processes for producing patterned metal deposits. For example, the use of aluminum or copper vapor deposition with a moving mask, masking bands to shadow the film surface, an oil-printing roll producing printed or patterned oil layers placed on the film surface to prevent adhesion of the aluminum or copper vapors on the film surface. As such, a plurality of individual, physically isolated aluminum or copper deposits may be created.

The discontinuous or patterned, metal layer may be created by various processes. In one embodiment, the moving substrate may be printed with an organic liquid to form a base pattern. A metal layer may be deposited to cover the printed substrate thereby creating a plurality of complementary metal pattern areas covering the printed substrate. The substrate is subsequently heated to vaporize the base pattern leaving the complementary metal patterns applied to the film. In another embodiment, a metal pattern may be created by selective chemical etching, or printing and etching a metallized film with a 100% metal surface coverage. The metallized film may be printed with an etchant, such as a caustic material, to selectively remove the metal deposit from the film surface in the printed area to leave a complementary metal pattern, washing the etchant from the film surface and drying the film prior to winding. Alternatively, the metallized film may be printed to form an image with a material resistant to the chemical attack of an etchant. The printed film may be subsequently passed through a bath of etchant material for a period of time sufficient to remove the metal layer not protected by the etchant resistant material. The etched material may be washed to remove excess etchant and dried prior to winding.

In a further embodiment, a film may be coated with a water soluble varnish applied over the entire film surface using a rotogravure printing machine or a similar coater. The film may be vacuum metallized to deposit a metal layer over the entire surface of the film, coated with the varnish. The metallized surface of the film may be printed with clear or pigmented water resistant inks using a rotogravure or similar printing system to create a printed image. Subsequently, the printed metallized varnished film may be washed with water to remove the areas not protected with the water resistant coatings to remove the water soluble varnish and the metal layer applied to it, followed by drying. As such, a patterned metallized film may be obtained. The film thus created has clear un-metallized areas as well as printed areas with the metal layer under the printed image. The printed image may be made of multicolored inks or clear inks.

In yet a further embodiment, a patterned metallized film may be prepared with a complementary metal oxide pattern. A preexisting metallized film may be printed with a pattern of hydrophobic ink to the metal surface. The printed, metallized film may be immersed into water heated to a temperature of approximately 80° C. or greater. As such, the warm water converts the metal layer not covered by the hydrophobic ink to the non-conductive metal oxide.

In various embodiments, each of the isolated metallized areas of the instant invention comprise a two-dimensional pattern of continuous deposits of the metal layer, which are continuous layers of vapor deposited metal physically separated by clear film areas. The metal deposits are essentially two-dimensional patterns or islands of, isolated, continuous, conductive deposits of metal, physically isolated from other deposits by physical spacing's of non-conductive areas formed in the metal layer. The films are non-conductive due to the presence of un-metallized areas surrounding and electrically isolating the two-dimensional metal deposits from adjacent metallized areas. The isolating nonconductive areas may be clear, metal free areas such as those formed by chemical etching, or from the formation of nonconductive oxide layers produced on the metallized film. The width of the spacing creates the loss of conduction and prevents electrical breakdown at a defined voltage applied to the discontinuous metal deposit. The exact dimensions of the non-conductive areas separating the individual conductive areas may be a function of the voltage applied to exposed pattern metallized surfaces and the polymer surface on which the metal is deposited. The dimensions of the non-conductive areas are to be chosen based upon the substrate polymer and the maximum voltage to which they are to be exposed. The films produced with a plurality of individual, physically isolated metal (e.g., aluminum or copper) deposits are non-conductive over large areas of the film. The bright reflective characteristics are maintained due to the multiplicity of individual continuous layers of reflective metal deposits, and electrical conduction across the surface when exposed to the physical separation of the individual physically isolated deposits is prevented.

In further embodiments, a nonconductive polymer film may be deposited onto the reflective film thereby reducing the potential for high voltage electrical conductance. This nonconductive polymer film may be deposited by an in chamber coating process, via an out of line solution, emulsion, extrusion coating or related printing process, a spray coating process or by an adhesive or extrusion lamination process. In some embodiments, the patterned metal deposition can also be applied to the inner surface of a non-conductive balloon film such as the heat sealing layer 214 illustrated in FIG. 2. The patterned deposition may be applied in register to a predefined balloon envelope shape to prevent diminishing the sealing functions of the inner sealing layer of the balloon envelop. In other embodiments, the deposited pattern can be designed such that the gas tight nature of the heat sealing area is not effected.

In various embodiments, the thickness of the films range from approximately 0.25 mil (25 gauge, or 6.25 microns) to 4 mil (400 gauge, 100 microns). In some embodiments, the thickness of the films range between 0.5 mil (50 gauge, or 12.5 microns) to 3 mil (300 gauge, 75 microns). In further embodiments, the thickness of the films range between 0.7 mil (70 gauge, or 18 microns) to 1.5 mil (150 gauge, 38 microns). The thickness of the gas barrier layer may be dependent on the structure of the envelop films, the desired flight times and the barrier polymer compositions chosen for any particular film design. The films may have a barrier layer thickness ranging from 80% to 25% of the total film thickness, tie layer thicknesses ranging from 10% to 40% of the total film thickness and surface sealing layers ranging from 5% to 40% of the total film thickness.

The optimum thickness of the balloons envelope film and total barrier layer thickness may be determined by the volume of the balloon envelope, the buoyancy produced by the volume of helium and the helium permeability requirements based on the flight time requirements. Flight times may be determined from loss in buoyancy due to helium permeability through the films as long as the weight and helium permeability of a balloon film are known. If flight time is specified for a given envelope size, the required helium permeability may be determined and the barrier structure (e.g., the selection of polymer, the layer structure, and the barrier layer thickness) of the envelope film can be selected.

The barrier layer composition, thickness and structure may be determined by balloon envelope size. Although larger volume balloons may have more buoyancy than smaller balloons and can lift a larger mass of film than smaller balloons, the surface area for diffusion of helium is larger which requires an increased thickness of the barrier polymer. Consequently, the envelope film weight, determined by the composite film density, thickness and envelop area must vary based on the balloon volume.

Figure 3:
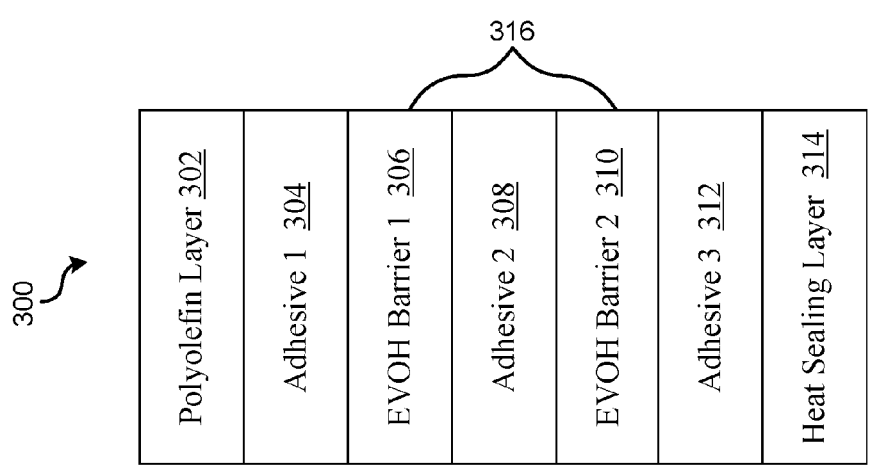
FIG. 3 illustrates an exemplary 7-layer non-conductive balloon films in accordance with various embodiments of the present application.

The optimum sealing layer thickness is determined by the sealant polymers ability to form hermetic seals at a given layer thickness and may be less sensitive to total envelope thickness. The sealant layer thickness may range from approximately 0.10 mils (2.5 microns) to 1.0 mil (25 microns). In some embodiments, the sealant layer thickness may range from 0.16 mil (4.0 microns) to 0.75 mil (19 microns). In further embodiments, the sealant layer thickness ranges from 0.24 mil (6.0 microns) to 0.50 mil (12.5 microns). The thickness of metallized barrier films range from approximately 0.25 mil (25 gauge, or 6.25 microns) to 4 mil (400 gauge, 100 microns). In some embodiments, the thickness ranges from 0.5 mil (50 gauge, or 12.5 microns) to 3 mil (300 gauge, 75 microns). In further embodiments, the thickness ranges from 0.7 mil (70 gauge, or 18 microns) to 1.5 mil (150 gauge, 38 microns). FIG. 3 illustrates an exemplary 7-layer non-conductive films 300 in accordance with various embodiments of the present application. The illustrated non-conductive balloon film 300 comprises a polyolefin layer 302, a first adhesive layer 304, a gas barrier core 316, a second adhesive layer 312, and a heat sealing layer 314. The gas barrier core 316 comprises a first EVOH gas barrier layer 306, an adhesive layer 308, and a second EVOH gas barrier layer 310. The EVOH barrier layers 306 and 310 may affect the gas barrier properties of the film 300. In particular, the specific ethylene content of a EVOH copolymer may affect the gas barrier properties of the film 300. The EVOH barrier layers 306 and 310 may be determined according to a predetermined level of barrier and flex crack resistance. In addition, the polyolefin layer 302 and the adhesive layers 304, 308, and 312 may affect the flex crack resistance. For embodiments that do not comprise a nylon layer such as the illustrated non-conductive film 300, moisture level of the EVOH may be controlled according to the inherent moisture barrier of the polyolefin layer 302 and the adhesive layers 304, 308, and 312. In other embodiments, the EVOH layers included in the illustrated film 300 may be replaced by nylon layers.

Figures 4A, 4B:
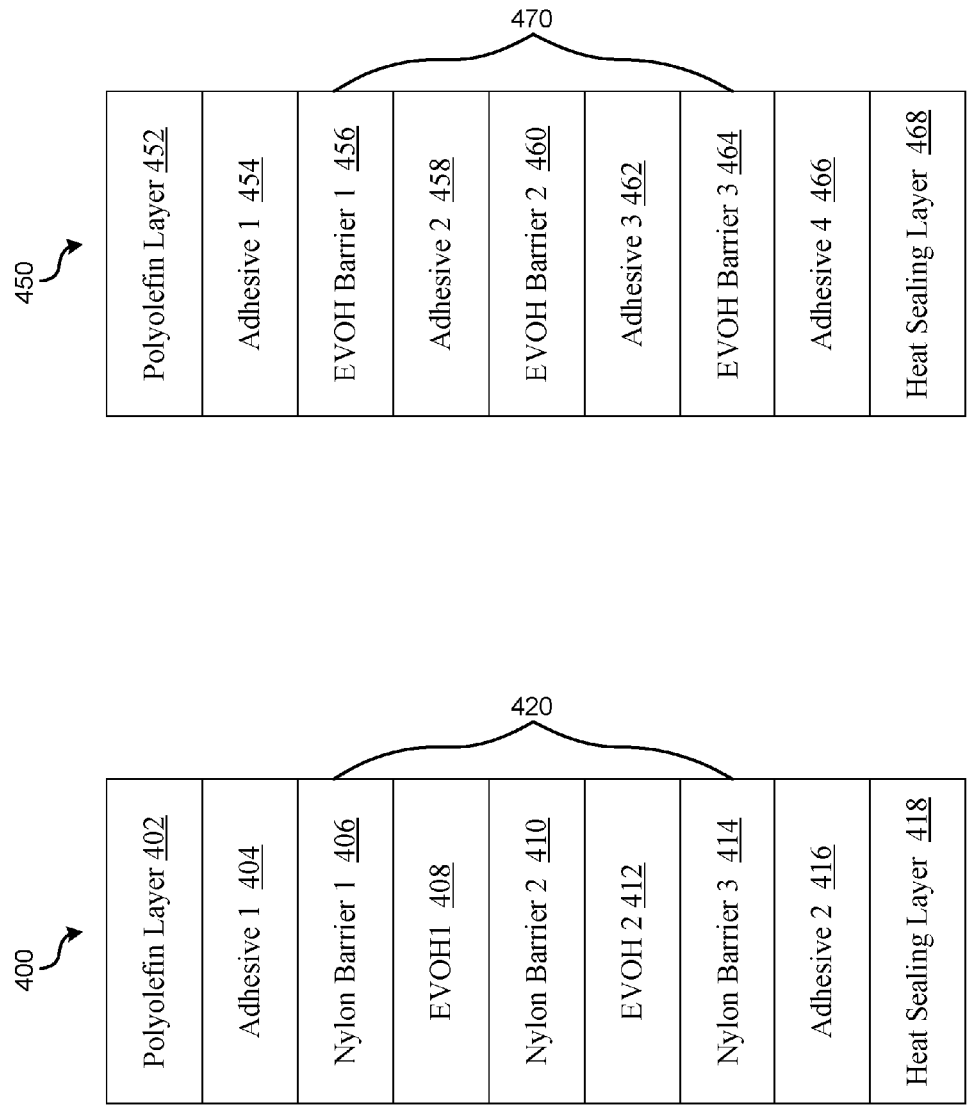
FIGS. 4A-4B illustrate exemplary 9-layer non-conductive balloon films in accordance with various embodiments of the present application.

FIGS. 4A-4B illustrate exemplary 9-layer non-conductive films 400 and 450 in accordance with various embodiments of the present application. The film 400 comprises a gas barrier core 420 made of nylon whereas the film 450 comprises a gas barrier core 470 made of EVOH. The film 400 is similar to the 7-layer structure of the film 200 illustrated in FIG. 2 where the gas barrier core is composed by alternating gas barrier layers (e.g., a nylon layer) and EVOH layers. The film 450 is similar to the 7-layer structure of the film 300 illustrated in FIG. 3 where the gas barrier core is composed by alternating EVOH layers and adhesive layers or alternating nylon layers and adhesive layers.

FIGS. 5A-5B illustrated exemplary 11-layer non-conductive balloon films 500 and 550 in accordance with various embodiments of the present application. The film 500 comprises a gas barrier core 524 comprising nylon gas barrier layers whereas the film 550 comprises a gas barrier core 570 comprising EVOH gas barrier layers. The film 500 comprises a nylon print and barrier layer 502, which is affixed to the polyolefin layer 506 by the adhesive layer 504. The film 550 comprises a nylon print and barrier layer 552, which is affixed to the polyolefin layer 556 by the adhesive layer 554. The gas barrier core 524 is further affixed to the polyolefin layer 506 by an adhesive layer 508 and the gas barrier core 574 is affixed to the polyolefin layer 556 by an adhesive layer 558. The gas barrier core 524 comprises alternating EVOH layers and nylon gas barriers. The gas barrier core 574 comprises alternating EVOH gas barrier layers and adhesive layers. The gas barrier core 524 may be further affixed to the heat sealing layer 522 by the adhesive layer 520 and the gas barrier core 574 may be further affixed to the heat sealing layer 572 by the adhesive layer 570.

The adhesive layers 504, 508, and 520 may be different from each other, and the adhesive layers 554, 558, 562, 566, and 570 may be different from each other. Each of the adhesive layers may be selected to be the optimum for affixing the adjacent two layers. The relative thickness of the polyolefin layers 506 and 556 may control the placement of the barrier cores 524 and 574 to the centerline of the films 500 and 550, respectively. In various embodiments, the barrier cores 524 and 574 are placed closer to the heat sealing layers 522 and 572 than the centerline of the films 500 and 550, respectively. A thicker polyolefin layer may provide a better barrier against moisture because the gas barrier layer may be sensitive to moisture from the environment.

Figures 6A, 6B, 6C:
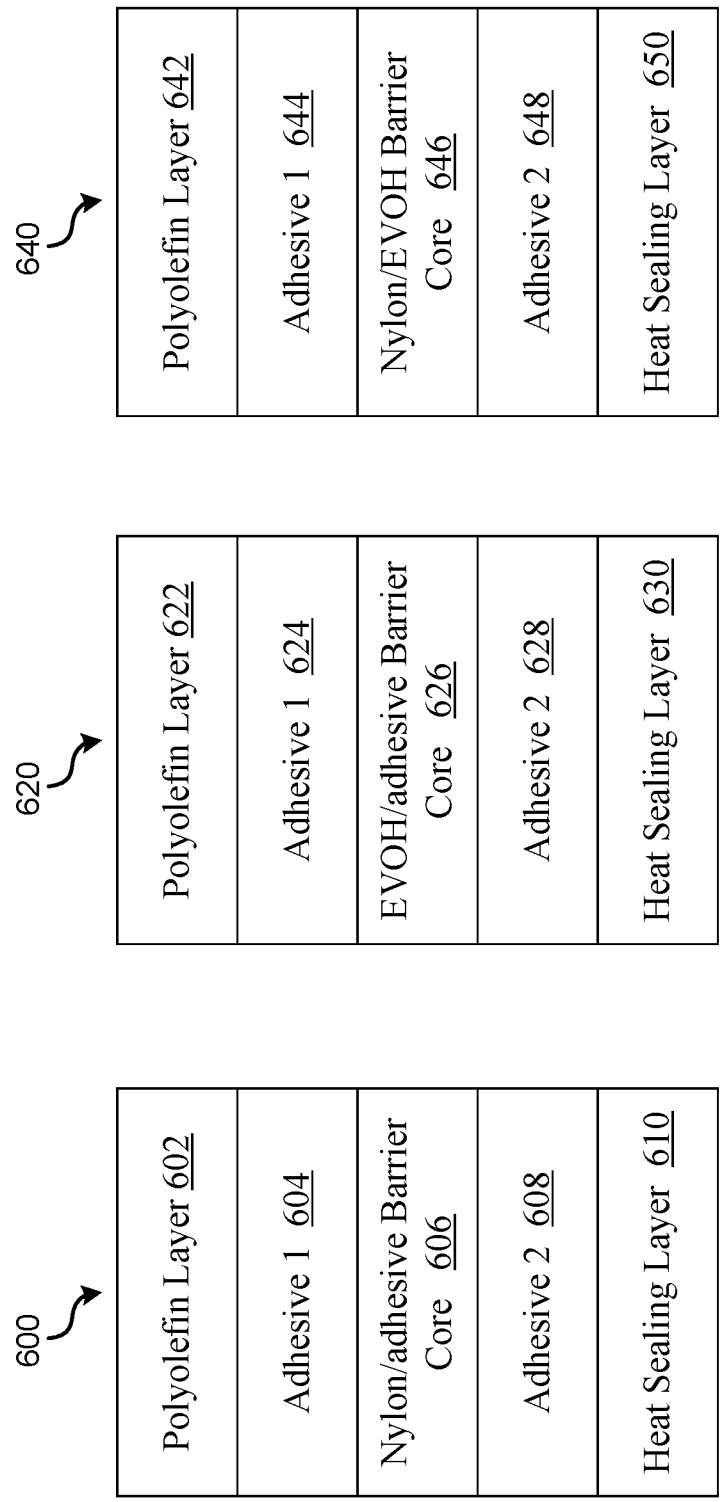
FIGS. 6A-6C illustrate exemplary balloon films having a barrier core with a nano-layer structure in accordance with various embodiments of the present application.

FIGS. 6A-6C illustrate exemplary non-conductive films 600, 620, and 640 having a barrier core with a nano-layer structure in accordance with various embodiments of the present application. In various embodiments, a barrier core such as the barrier core 216 illustrated in FIG. 2, may comprise a set of gas barrier layers. Any two gas barrier layers of the set of barrier layers may be separated by a polymer layer. For example, in the illustrated example of FIG. 2, the barrier core 216 comprises a first gas barrier layer 206 and a second gas barrier layer 210, separated by a polymer layer, that is, the EVOH layer 208. In various embodiments, at least one barrier layer of the set of barrier layers may have a nano-layer structure. For example, the barrier layer having a nano-layer structure may comprise a set of sub-barrier layers, where any two adjacent sub-barrier layers may be separated by a sub-polymer layer. In one embodiment, a barrier layer may comprise at least eight (8) sub-barrier layers, where the adjacent sub-barrier layers are separated by a sub-polymer layer. The sub-polymer layer may be a barrier resin or a non-barrier resin.

In the illustrated examples, the non-conductive balloon film 600 comprises a barrier core 606 having a nano-layer structure. The barrier core 606 comprises a set of nylon layers and a set of adhesive layers, where the set of nylon layers and the set of adhesive layers are arranged as a nano-structure. In various embodiments, the illustrated barrier core 606 may have a nano-layer structure of 16 to 64 alternating nylon and adhesive layers. The nylon material included in the barrier core 606 may be selected according to a predetermined gas barrier required such that to control the float time of a balloon.

The non-conductive balloon film 620 comprises a set of EVOH layers and a set of adhesive layers, where the set of EVOH layers and the set of adhesive layers form a nano-structure. The barrier core 626 may comprise a nano-layer structure of 16 to 64 alternating EVOH and adhesive layers. The EVOH included in the barrier core 626 may be selected according to a predetermined gas barrier required such that to control the float time of a balloon.

Further embodiments may comprise a barrier core made of nylon and EVOH blending materials. EVOH provide a better gas barrier capability than nylon but the cost of EVOH is higher than the cost of nylon. A material made by blending nylon with EVOH (e.g., with a nylon composition of 20% to 40%) may improve the EVOH ductility without compromising the EVOH gas barrier capabilities. The barrier core 646 may comprise a nano-layer structure of 16 to 64 nylon and EVOH blended layers.

The non-conductive balloon film 640 comprises a nano-layer barrier core 646 comprising a set of alternating EVOH layers and nylon layers. Each of the set of EVOH layer is a gas barrier layer and each of the set of nylon layers is a synergistic or adhesive layer. Sandwiching an EVOH layer between two nylon layers may improve the durability of the EVOH layer. In addition, a nylon layer may function as a desiccant layer to maintain the EVOH layer at a lower moisture content thereby maintaining the gas barrier property of the EVOH layer as a nylon layer absorbs and binds more moisture than an EVOH layer. Nevertheless, a EVOH layer cannot be too thin such that the Nylon layer affects the crystalline development of the EVOH layer and decrease the EVOH gas barrier layer giving a sudden loss in gas barrier with the increase in the number of layers.

Figure 7:
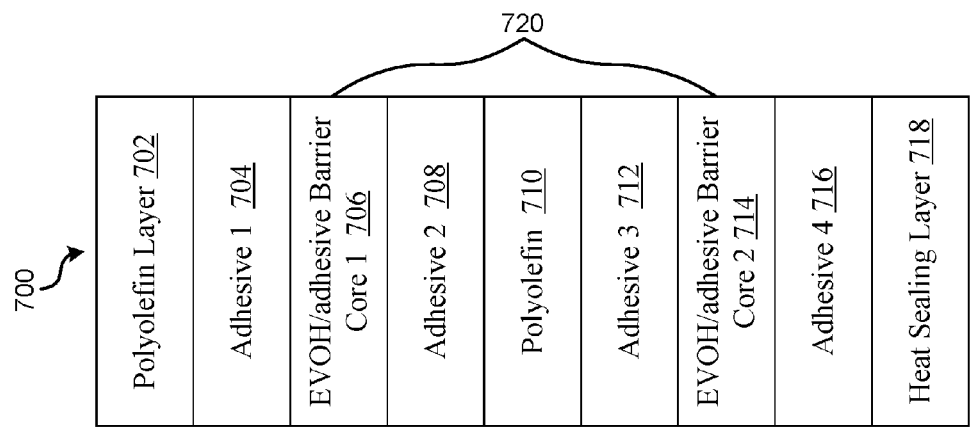
FIG. 7 illustrates an exemplary balloon film 700 having a barrier core having multiple sub-barrier cores, where each of the sub-barrier core has a nano-layer structure in accordance with an embodiment of the present application.

In some embodiments, a gas barrier core having a nano-layer structure may be located centrally in a non-conductive balloon film or off centered towards either of the surfaces. In other embodiments, a gas barrier core may comprise a set of sub-gas barrier cores. FIG. 7 illustrates an exemplary balloon film 700 having a barrier core having multiple sub-barrier cores, where each of the sub-barrier core has a nano-layer structure in accordance with an embodiment of the present application. The non-conductive balloon film comprises a barrier core 720. The barrier core 720 comprises a first barrier core 706 and a second barrier core 714. The first barrier core 706 and the second barrier core 714 are separated by a polyolefin layer 710. The polyolefin layer 710 may comprise multiple layers of polymers. The first barrier core 706 and the second barrier core 714 each may have a nano-structure with 16 to 32 alternating EVOH and adhesive layers. In other embodiments, the first barrier core and the second barrier may have a nano-structure with 16 to 32 alternating nylon and adhesive layers. Alternatively, the first nanolayer barrier core may have a nano-structure with 16 to 32 alternating Nylon layers while the second nanolayer barrier core may have a nano-structure with 16 to 32 alternating EVOH layers. The first barrier core and the second barrier may each have a nano-structure with 16 to 32 alternating nylon and EVOH layers.

Various embodiments comprise a biodegradable or bio-based film. In some embodiments, each layer of the non-conductive balloon film is biodegradable, compostable, or bio-based. The biodegradable film or bio-based film is a polymer film where at least 80% of the polymer film by weight is derived from a non-petroleum or biorenewable feedstock. Up to about 20% of a biodegradable, compostable, or bio-based film may be a polymer sourced from petroleum. The biodegradable or bio-based films may be made of materials such as polyhydroxybutyrate-valerate ("PHBV"), polylactide ("PLA"), or polyhydroxy-alkanoate ("PHA"). In some embodiments, a biodegradable or bio-based film may be made of polylactic acid (also known as "PLA.") The PLA is a compostable, thermoplastic, and aliphatic polyester derived from lactic acid, and may have physical properties similar to PET and excellent clarity. The PLA may be produced in a high molecular weight form through ring-opening polymerization of lactide or lactic acid by use of a catalyst and heat. The PLA may be made from plant-based feedstock (e.g., soybeans, corn, wheat, or sugar beets) or from the fermentation of agricultural by-products (e.g., corn starch) or other plant-based feedstock. The PLA can be processed like most thermoplastic polymers into a film. PLA films degrade into carbon dioxide and water at temperatures above its glass transition temperature. In one embodiment, the bio-based film layer comprises at least about 90% polylactic acid.

In some embodiments, the biodegradable or bio-based film is made of PHA, which is a polymer belonging to the polyesters class and can be produced by microorganisms as a form of energy storage. Microbial biosynthesis of PHA may start with the condensation of two molecules of acetyl-CoA to create acetoacetyl-CoA, which may be subsequently reduced to hydroxybutyryl-CoA. Hydroxybutyryl-CoA may be used as a monomer to PHA such as polymerize Polyhydroxybutyrate ("PHB").

Various embodiments including PLA, PHA (e.g., PHB), or polyhydroxybutyrate-valerate ("PHBV") can be produced by coextruding the biodegradable, bio-based polymers into a film sheet in combination with a gas-barrier core. The bio-based films may replace polyolefin resins included in a non-conductive film, such as those used in the synergistic, the intermediate layers and the surface layers of the film. Various embodiments may be cast or blown or oriented in the machine direction or the transverse direction. In one embodiment, the bio-based film comprises a biaxially oriented film. In one embodiment, PHBV rich blend resin may be coextruded onto a surface of a bio-based film to form a surface layer, upon which graphics may be printed. Heat sealable surface layers of PHBV, PHB or PLA may also be used to form the heat sealing surface of an non-conductive balloon film. A biodegradable or bio-based film may also be solvable in water and extrudable, such as polyglycolide or Polyglycolic acid ("PGA"), or similar natural barrier polymers.

Figure 8:
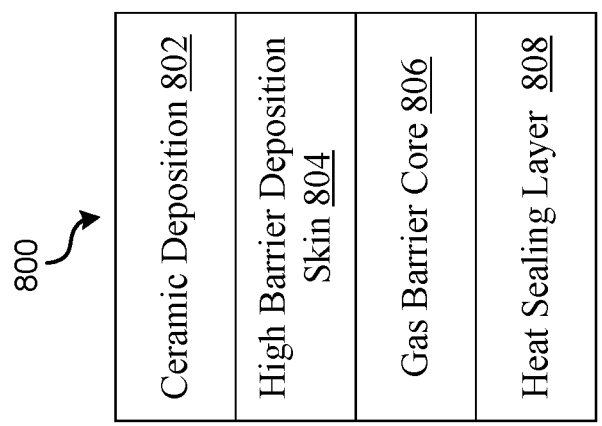
FIG. 8 illustrates an exemplary non-conductive balloon film in accordance with an embodiment of the present application.
Figure 9C:
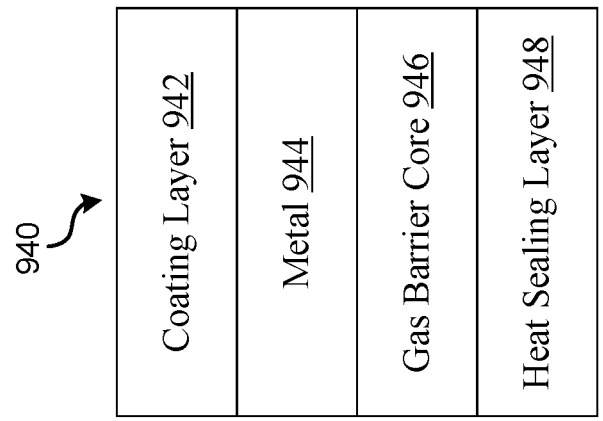
Figure 9B:
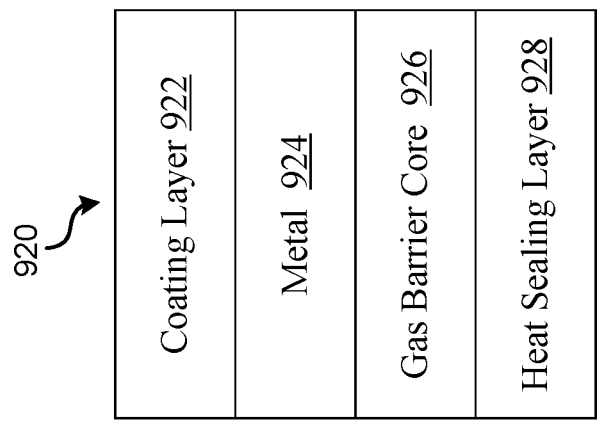
Figure 9A:
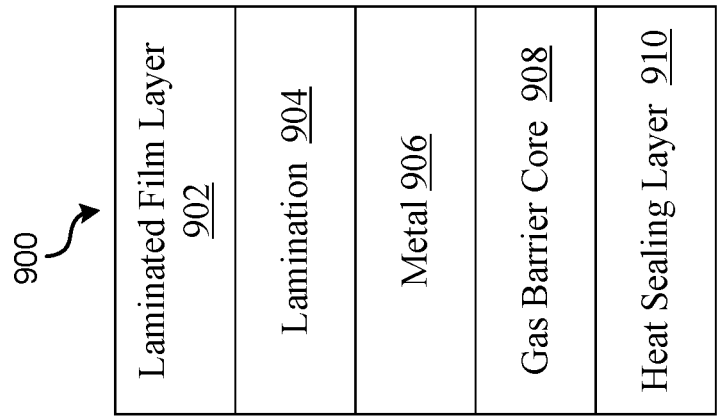

FIG. 8 illustrates an exemplary non-conductive balloon film 800 in accordance with an embodiment of the present application. The non-conductive balloon film 800 comprises a ceramic layer 802, a high barrier deposition skin 804, a gas barrier core 806, and a heat sealing layer 808. The gas barrier core 806 may comprise a set of oriented nylon, PET, or OPP sheets. The ceramic layer 802 may be materials such as $SiO_2$, SiOx, $Al_2O_3$, $CeO_2$, $Ce_2O_3$, or AlOxNy, and the ceramic layer 802 may be deposited onto the high barrier deposition skin 804. The high barrier deposition skin 804 may be the decorating surface of the non-conductive balloon film 800. The high barrier deposition skin 804 may be made of materials such as an amorphous nylon, amorphous PET, EVOH, PET or flame treated HDPE may optimize the barrier properties of the ceramic layer 802. The deposition skin 804 may be selected according to the materials of the ceramic to provide an optimum surface for optimizing the gas barrier property of the ceramic selected. In various embodiments, the ceramic layer 802 may be top coated or laminated. In another embodiment, the ceramic layer 802 may be replaced with a metal deposited layer. The metal-deposited layer 802 may be materials such as, Al, Cu, Ag, Au, Ni.

FIGS. 9A-9E illustrated exemplary non-conductive balloon films 900, 920, 940, 960, and 980 in accordance with various embodiments of the present application. The non-conductive balloon film 900 comprises a laminated film layer 902, a lamination layer 904, a metal layer 906, a gas barrier core 908, and a heat sealing layer 910. The metal layer 906 may be a layer of continuous metal deposited on the gas barrier core 908. In one embodiment, the metal layer 906 is a vapor deposited aluminum layer. The metal layer 906 may enhance the gas barrier properties of the film 900 and may further increase the balloon float time. The laminated film layer 902 may be surface or reverse printed, and may be PET or OPP based. The lamination layer 904 is affixed to the surface of the metal layer 906 by adhesive, thermal, or extrusion lamination. The adhesives may be one or two part adhesives, and the extrusion adhesive layer may be LDPE. The laminated film layer 902 may be affixed to the metal deposition by using the 12 micron PE extrusion lamination. The laminated film layer 902 may be a non-conductive polymer film and may insulate the metal layer 906. In various embodiments, the thickness of the laminated film layer 902 may be in the range of 8 to 18 microns.

Similar to the non-conductive film 900, the non-conductive films 920 and 940 may comprise a metal layer 924 and a gas barrier core layer 926, respectively. The coating layers 922 and 942 may be applied to the metal layer 924 and the metal layer 926, respectively. The coating layer 922 or 942 may be a polyolefin extrusion coating layer having a thickness in the range of 8 to 24 microns. The coating layers 902, 922, and 942 may be surface printed. Each of the coating layers 902, 922, and 942 may be a solution coated layer using any liquid born film forming polymer and be applied by coating methods such as gravure, airknife, Myer rod or spray.

The coating layers 902, 922, and 942 may be non-conductive polymer (e.g., a polyolefin film or acrylic polymer) and applied to the metal surface via liquid solution or emulsion coating or lamination such as extrusion, adhesive or thermal laminations. As such, the non-conductive layer is directly applied to the metal surface by extrusion coating or liquid coating. The extrusion coating extrudes a molten layer of the polyolefin onto the metal surface, whereas the liquid coating applies a polymer solution or emulsion and removes the solvent by drying leaving an insulating polymer layer. The metal layer is thereby insulated from any electrical current by the resistance of the non-conductive polymer layer deposited on the metal even though the metal layer itself remains conductive. The composition, thickness and defect concentration of the applied polymer films determine the electric breakdown of the non-conductive coating layer.

The films 960 and 980 each comprise a metal deposition 964 and 984, respectively. Further, the surfaces of the metal deposition 964 and 984 are treated by adding a non-conductive polymer film 962 and 982, respectively. As such, the films 960 and 980 are insulated. The non-conductive polymer films 962 and 982 may be applied as a vapor or coated as a liquid to the metal coating layer and subsequently polymerized by UV, Electron or other actinic radiation within the metallization chamber. The gas barrier may be further enhanced by including a second coating layer to the other surface of the metal layer, such as illustrated in FIG. 9E. The gas barrier core layer 988 may be deposited with the coating layer 986 prior to the metal layer 964 being deposited onto the coating layer 986.

FIG. 10 illustrates an exemplary non-conductive film 1000 in accordance with an embodiment of the present application. The film 1000 comprises a metal layer 1002 that is deposited onto a surface of the gas barrier core 1004. The metal layer 1002 may be a patterned metal layer such that the metal film is discontinuous. Accordingly, the surface of the film 1000 is not conductive. The addition of the patterned metal deposit may enhance the gas barrier properties of the film 1000 by decreasing the area of surface diffusion from the film. The metal layer may be further coated similar to the embodiments illustrated in FIGS. 9A-E to improve its graphics capabilities or to protect the metal deposit layer 1002. The metal layer 1002 may be patterned in a wide range of geometric shapes and carry information such as texts or graphics.

FIGS. 11A-B illustrate exemplary non-conductive films 1100 and 1120 in accordance with various embodiments of the present application. The films 1100 and 1120 include biodegradable or compostable films to minimize the environmental impact of lost or released balloons. The gas barrier property of the film 1100 may be enhanced by a barrier primer layer 1104 applied by coextrusion. The film 1100 comprises a PETG film skin for high barrier metallization, and the film 1120 comprises a PVOH/EAA inline coated high barrier metallization primer for high barrier metallization. The gas barrier property of the film 1120 may be enhanced by the application a barrier primer layer 1124 by an inline coating process. The heat sealing layers 1108 and 1128 may be amorphous PLA, PHA, PHVB, or other similar materials.

Various embodiments may be produced by coextrusion. Non-conductive films may be produced by cast coextrusion or blown coextrusion. Films may further be oriented to enhance the physical and gas barrier properties. The films are extensible for balloon envelopes of various shapes when inflated. The embodiments having a nano-layer structure may be produced from alternating barrier resin pairs or by alternating a barrier resin and a non-barrier or synergistic layer resin. The synergistic layer resin may be a resin with either a high or a low chemical bonding with the barrier resin that may enhance a specific mechanical property of the film (e.g., a polyolefin, a tie or bonding resin, or a blend of a mix of polyolefin and bonding resin.) The primary barrier resin may be nylon, EVOH, or a mix of nylon and EVOH. A primary barrier resin may be copolymers of ethylene and vinyl alcohol with an average ethylene content of between 25 mol % to 48 mol %. Other exemplary copolymers may include acrylonitrile copolymers, polyurethane engineering plastics, ethylene vinyl alcohol copolymers, polyvinylidiene chloride, liquid crystal polymers, amorphous nylons, VINEX poly (vinyl alcohol), and Polyglycolic acid or polymethylpentene resins.

A synergistic layer may comprise a polyolefin, a tie, adhesive, or bonding resin, or a mix of a polyolefin and bonding resin, or a nylon if used in conjunction with an EVOH barrier layer. Exemplary resins include polyolefin resins, or copolymers of polyolefins (e.g., polyethylene, polypropylene, or a combination of thereof). A polymer resin may additionally include copolymers of polyethylene with minor amounts of other $C_{4-10}$ olefins, particularly $C_{4-8}$ polyolefins. In some embodiments, polyethylenes include HPLDPE resins, or LLDPE resins having a density of from about 0.925 to about 0.945 g/cm$^3$. In some embodiments, polymers include polypropylenes such as isotactic, that have a density of from about 0.89 to about 0.91 g/cm$^3$. In other embodiments, an adhesive resin is a modified olefinic polymer containing carboxyl groups obtained by combining chemically (e.g. by addition reaction, graft reaction, etc.) Exemplary olefinic polymers include polyolefins such as polyethylene (low-density, medium-density, high-density), linear low-density polyethylene, polypropylene, polybutene, or a copolymer of an olefin and a comonomer copolymerizable (e.g. vinyl esters, unsaturated carboxylic acid esters etc.) Exemplary copolymers include ethylene-vinyl acetate copolymer and ethylene-ethyl acrylate copolymer. Some embodiments comprise the ethylene-vinyl acetate copolymer (vinyl acetate content 5-55% by weight) and the ethylene-ethyl acrylate copolymer (ethyl acrylate concentration 8-35% by weight).

The ethylenically unsaturated carboxylic acid or its anhydride includes ethylenically unsaturated monocarboxylic acids, esters thereof, ethylenically unsaturated dicarboxylic acids, mono- or di-esters thereof, and anhydrides thereof. Some embodiments use the anhydrides of the ethylenically unsaturated dicarboxylic acids. For example, maleic acid, fumaric acid, itaconic acid, maleic anhydride, itaconic anhydride, monoethyl maleate, monoethyl maleate, diethyl maleate, or methyl fumarate may be used. One embodiment uses the maleic anhydride. The amount of the ethylenically unsaturated carboxylic acid or its anhydride to be added or grafted to the olefinic polymer. The amount in various embodiments is generally 0.01-15% by weight. In one embodiment, the amount is 0.02-10% by weight.

In various embodiments, one or more adhesive resins may be used. The adhesives resins may be used singly, as a mixture of two or more thereof, or blended with other synergistic polymers. As such, various embodiments provide excellent flexing endurance. In various embodiments, the thickness of each adhesive resin layer is preferably 2-10 micro-meters (μm).

As used herein, the terms less than, less than or equal to, greater than, and greater than or equal to, may be used herein to describe the relations between various objects or members of ordered sets or sequences; these terms will be understood to refer to any appropriate ordering relation applicable to the objects being ordered.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of creating a non-conductive film for lighter than air balloons, comprising:
  treating an outer layer of a substrate with one or more surface treatment methods;
  depositing a metal adhesion prevention agent comprising oil on the treated outer layer of the substrate to create a pattern; and
  vapor depositing a metal comprising aluminum over the patterned outer layer of the substrate resulting in a patterned aluminum layer comprising a set of isolated aluminum areas and a set of transparent areas;
  wherein the substrate comprises:
    a polyolefin layer;
    a heat sealing layer;
    a first adhesive layer;
    a second adhesive layer; and a gas barrier core comprising a set of gas barrier layers sandwiched between first and second adhesive layers, the gas barrier core having a first surface and a second surface, each gas barrier layer comprising a biodegradable or bio-based materials film;

wherein the outer layer of the substrate is the polyolefin layer; and wherein the treatment of the outer layer of the substrate is configured to enhance surface receptivity to the vapor deposited aluminum; and wherein the lighter than air balloon comprises helium.

2. The method of claim 1, further comprising affixing the heat sealing layer to the second surface of the gas barrier core.

\* \* \* \* \*